United States Patent [19]

Itse et al.

[11] Patent Number: 4,457,241

[45] Date of Patent: Jul. 3, 1984

[54] METHOD OF BURNING PULVERIZED COAL

[75] Inventors: Daniel C. Itse, Worcester, Graig A. Penterson, Sutton, both of Mass.

[73] Assignee: Riley Stoker Corporation, Worcester, Mass.

[21] Appl. No.: 469,117

[22] Filed: Feb. 23, 1983

Related U.S. Application Data

[62] Division of Ser. No. 333,910, Dec. 23, 1981, abandoned.

[51] Int. Cl.³ .............................................. F23K 5/00
[52] U.S. Cl. .................................. 110/347; 431/182; 431/186; 110/261; 110/264; 110/265
[58] Field of Search ............................... 110/260-265, 110/347; 431/186, 284, 285, 351

[56] References Cited

U.S. PATENT DOCUMENTS

| | | | |
|---|---|---|---|
| 1,073,463 | 9/1913 | Banes | 110/261 |
| 1,779,647 | 10/1930 | Van Brunt . | |
| 1,953,090 | 4/1934 | Vroom . | |
| 2,046,767 | 7/1936 | Campbell | 110/261 |
| 2,190,190 | 2/1940 | Peterson | 431/186 |
| 2,284,708 | 6/1942 | Wooley | 110/261 |
| 2,325,318 | 7/1943 | Hendrix . | |
| 3,147,795 | 9/1964 | Livingston et al. | 110/261 |
| 3,250,236 | 5/1966 | Zelinski | 110/265 |
| 3,349,826 | 10/1967 | Poole et al. . | |
| 3,782,884 | 1/1974 | Shumaker | 431/186 |
| 3,788,797 | 1/1974 | Mayfield et al. | 431/186 |
| 3,934,522 | 1/1976 | Booker | 431/186 |
| 4,019,851 | 4/1977 | Smith et al. | 431/9 |
| 4,050,879 | 9/1977 | Takahashi et al. | 431/186 |
| 4,089,628 | 5/1978 | Blackburn | 431/6 |
| 4,147,116 | 4/1979 | Graybill | 110/264 |
| 4,157,889 | 6/1979 | Bonnel | 431/182 |
| 4,206,712 | 6/1980 | Vatsky | 110/264 |
| 4,221,558 | 9/1980 | Santisi | 431/183 |
| 4,321,034 | 3/1982 | Taccone | 110/264 |
| 4,333,405 | 6/1982 | Michelfelder et al. | 110/265 |

Primary Examiner—Henry C. Yuen
Attorney, Agent, or Firm—Mason, Kolehmainen, Rathburn & Wyss

[57] ABSTRACT

A method of burning pulverized coal and other fuels comprises the steps of containing a primary flowing stream of coal/air mixture received adjacent an inlet end of a tubular nozzle for discharge at an outlet end into a combustion zone of a furnace for burning. The stream is accelerated in a convergent venturi section upstream of the outlet to distribute and concentrate the coal particles toward a central portion of the venturi in a minimum area throat, followed by decelerating the flow downstream of the venturi throat in a convergent flow section while forming a shallow, annular, conically shaped flow pattern around a hollow spreader cone mounted in the convergent section. The annular flow is caused to swirl around the axis of the cone by vanes outwardly thereof within the convergent flow section of the venturi, thus forming a stable, annularly-shaped, swirling flow pattern for discharge into the combustion zone, wherein the coal is burned in an elongated flame pattern extending along the stabilized conical flow pattern. A zone of high temperature and reducing atmosphere is formed adjacent the hollow outer end of the cone due to recirculation of combustion products into the rich fuel/air mixture wherein the volatiles in the coal are driven off early in the combustion process and are rapidly burned in a continuing process reducing the formation of oxides of nitrogen.

6 Claims, 3 Drawing Figures

METHOD OF BURNING PULVERIZED COAL

This application is a division of application Ser. No. 06/333,910, filed Dec. 23, 1981, abandoned.

BACKGROUND OF THE INVENTION

1. Field of the Invention

The present invention relates to a novel method for introducing pulverized coal to a furnace in a manner which minimizes the formation of oxides of nitrogen in the burning process.

2. Description of the Prior Art

A wide variety of burner designs have been developed over the years and some of the burners used in furnaces, boilers and the like have been especially suited for burning pulverized coal. One of the major problems in burning pulverized coal as well as other fossil fuels is the production of oxides of nitrogen in the combustion process. Many attempts at burner design have been directed toward reducing the amount of oxides of nitrogen that are formed. Such oxides, known as NOX cause air pollution and are generally objectionable.

A number of articles and reports have been published concerning oxides of nitrogen including burner designs and methods of reducing and controlling the formation of "$NO_x$.", and are listed as follows:

(1) Lim, K. J., Milligan, R. J., Lips, H. I., Castaldini, C., Merrill, R. S. and Mason, H. B., "Technology Assessment Report for Industrial Boiler Applications: $NO_x$ Combustion Modification," Acurex Corporation for Environmental Protection Agency, EPA-600/7-79-178f, Research Triangle Park, NC, December, 1979.

(2) & (4) Heap, M. P., Lowes, T. M., Walmsley, R., Bartelds, H. and LeVaguerese, P., "Burner Criteria for $NO_x$ Control, Volume 1, Influence of Burner Variables on $NO_x$ in Pulverized Coal Flames," International Flame Research Foundation, EPA-600/2-76-061a, March, 1976.

(3) Brown, R. A., Mason, H. B., Schreiber, R. J., "Systems Analysis Requirements for Nitrogen Oxide Control of Stationary Sources." NTIS-PB-237-367, EPA-650/2-74-091, September, 1974.

(5) Information presented at the Third Technical Panel Meeting, "EPA Low $NO_x$ Burner Technology and Fuels Characterization," Newport Beach, CA, November, 1979.

(6) Beer, J. M., and Chigier, N. A., "Combustion Aerodynamics" Applied Science Publishers, 1972.

(7) Dykema, O. W., "Analysis of Test Data for $NO_x$ Control in Coal Fired Utility Boilers," Aerospace Corporation for Environmental Protection Agency, EPA 600/2-76-274 (NTIS No. PB 261 066,) Research Triangle Park, NC, October, 1976.

(8) Martin, G. B. and Bowen J. S., "$NO_x$ Control Overview, International Symposium on $NO_x$ Reduction in Industrial Boilers, Heaters and Furnaces," Houston, TX, Oct., 22–23, 1979.

(9) Rawdon, A. H. and Johnson, S. A. "Application of $NO_x$ Control Technology to Power Boilers," Proceedings of the American Power Conference, Vol. 35, pp. 828–837, 1973.

(10) Rawdon, A. H., Lisauskas, R. A., Zone, F. J., "Design and Operation of Coal-Fired Turbo® Furnaces for $NO_x$ Control," presented at the Second EPRI $NO_x$ Technology Seminar, Denver, CO, November, 1978.

(11) Brown, R. A., "Alternate Fuels and Low $NO_x$ Tangential Burner Development Program," proceedings of the Third Stationary Source Combustion Symposium Volume II, Advanced Processes and Special Topics, Acurex Corporation for Environmental Protection Agency, EPA-600/7-79-0506, Research Triangle Park, NC, February 1979.

(12) Zeldovich, J., "Acta Physicochimica U.R.S.S.," Volume 21, No. 4, 577, 1946.

(13) Pershing, D. W., Brown, J. W., Martin, G. B. Berkau, E. E., "Influence of Design Variables on the Production of Thermal and Fuel $NO_x$ from Residual Oil and Coal Combustion," presented at the 66th Annual AICHe Meeting, Philadelphia, PA, November, 1973.

The following U.S. Patents are directed towards burners for furnaces and the like which employ pulverized coal or other hydrocarbon fossil fuels as a source of energy for combustion:

U.S. Pat. No. 246,321, Litchfield et al. U.S. Pat. No. 3,007,084, Thomasian et al; U.S. Pat. No. 1,342,135, Schmidt; U.S. Pat. No. 3,150,710, Miller; U.S. Pat. No. 1,817,911, Andrews et al; U.S. Pat. No. 3,450,504 Korwin; U.S. Pat. No. 1,953,090, Vroom; U.S. Pat. No. 4,019,851 Smith et al; U.S. Pat. No. 1,993,901, Silley; U.S. Pat. No. 4,089,628, Blackburn; U.S. Pat. No. 2,158,521, Nahigyan; U.S. Pat. No. 4,147,116 Graybill; U.S. Pat. No. 2,325,318, Hendrix; U.S. Pat. No. 4,157,889, Bonnel; U.S. Pat. No. 2,823,628, Poole et al; U.S. Pat. No. 4,228,747 Smirlock et al.

OBJECTS OF THE PRESENT INVENTION

It is an object of the present invention to provide a new and improved, method of burning pulverized coal, hydrocarbons and other fossil fuels.

More particularly, it is an object of the present invention to provide a new and improved method of the character described and which produces a reduced or minimal amount of oxides of nitrogen in the combustion process.

Another object of the present invention is to provide a new and improved method of the character described which is especially well suited for burning pulverized coal.

Yet another object of the present invention is to provide a new and improved method for burning pulverized coal which provides an extra long flame pattern and means for drawing back the flame toward a stagnation area of high temperature and reducing atmosphere wherein the volatiles in the coal are driven off rapidly without any substantial formation of oxides of nitrogen.

Still another object of the present invention is to provide a new and improved method of the character described which forms a long flame pattern so that the burning time interval is increased with a resultant lower peak flame temperature.

Yet another object of the present invention is to provide a new and improved method of burning pulverized coal of the character described which is relatively simple and straight forward in operation, and which is extremely economical in a variety of different coal burner applications.

BRIEF SUMMARY OF THE INVENTION

The foregoing and other objects and advantages of the present invention are accomplished in a new and improved, low NOX burner nozzle for pulverized coal and other fuels comprising a hollow, tubular nozzle having an inlet for receiving a primary flowing stream of coal/air mixture and an outlet end for discharge of the stream into the combustion zone of a furnace. An annular, venturi-like flow constrictor is coaxially mounted in the nozzle with a divergent flow section having a maximum diameter portion adjacent the outlet end and a convergent flow section positioned upstream thereof for concentrating the flow of pulverized coal toward the central portion of the nozzle. A flow spreader is mounted in coaxial alignment in the divergent flow section of the venturi-like flow constrictor and is adjustable for movement in an axial direction in the nozzle. The flow spreader has a maximum diameter, open end positioned adjacent the outlet end of the nozzle and wall surfaces thereof cooperate with facing wall surfaces of the divergent flow section to form an annular, discharge pattern extending outwardly from the end of the nozzle.

Swirl vanes are provided between the cooperating wall surface of the spreader and the divergent flow section for imparting a swirling action to the flow which stabilizes the annular pattern of the primary coal/air stream discharged into the combustion zone of the furnace. This stabilized discharge pattern aids in the formation of an inner recirculation zone, and forms a shield that provides a high temperature, stagnation area with a reducing atmosphere adjacent the open end of the conical spreader. A portion of the combustion products is drawn back towards the open end of the spreader into the high temperature area wherein the volatiles in the coal are driven off and burned in the reducing atmosphere thereby minimizing the formation of NOX in the burner. A flow of secondary air is introduced to form an annular, outer, swirling air pattern surrounding the primary coal/air stream discharged from the outlet end of the conduits. The flow velocity of the primary and secondary streams are regulated to form a torroidal recirculation zone outwardly surrounding the coal/air stream.

BRIEF DESCRIPTION OF THE DRAWINGS

For a better understanding of the present invention, reference should be taken in conjunction with the drawings, in which.

DESCRIPTION OF A PREFERRED EMBODIMENT

Figure 1:
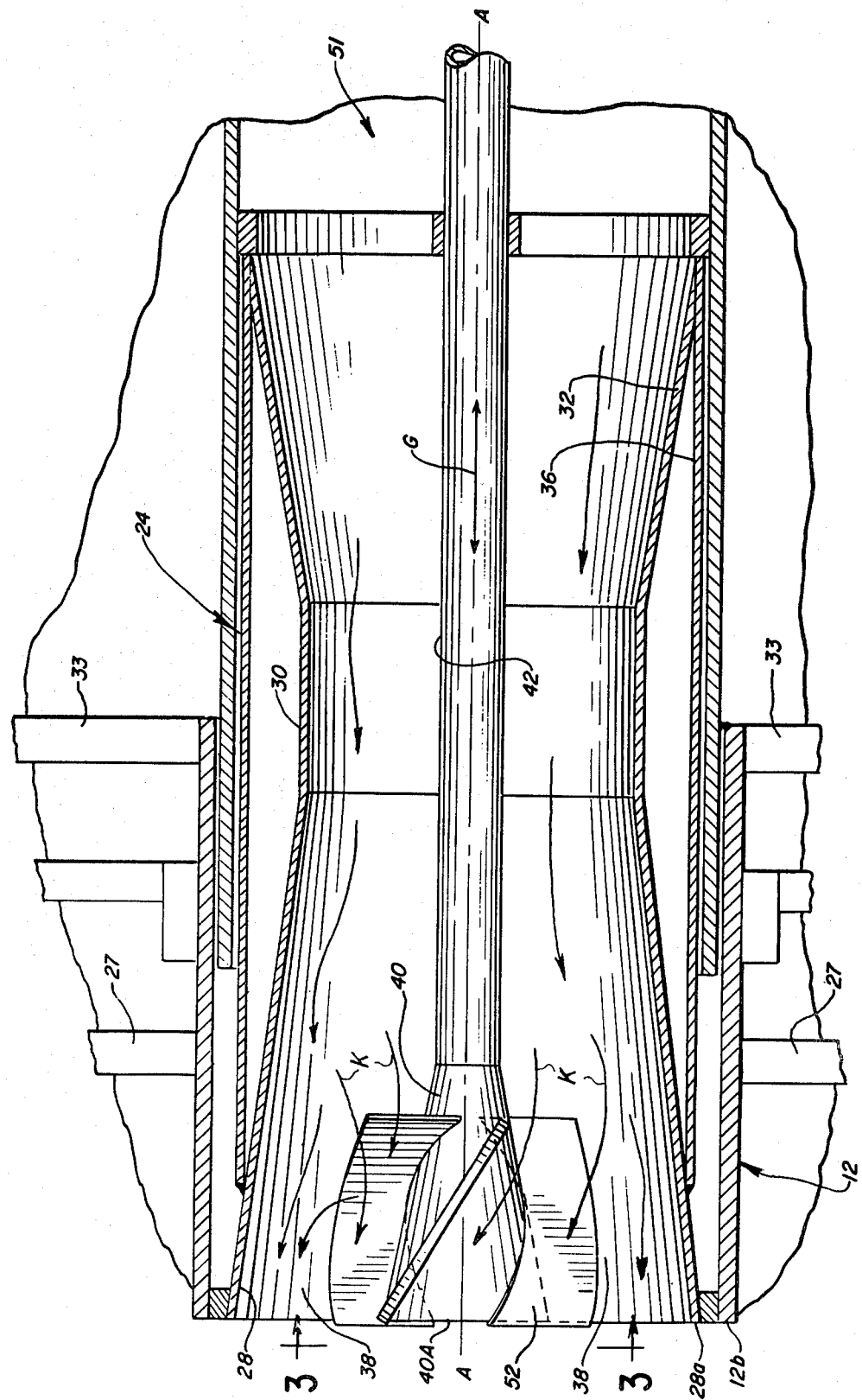
FIG. 1 is a cross-sectional view of a new and improved burner nozzle for pulverized coal constructed in accordance with the features present invention.
Figure 2:
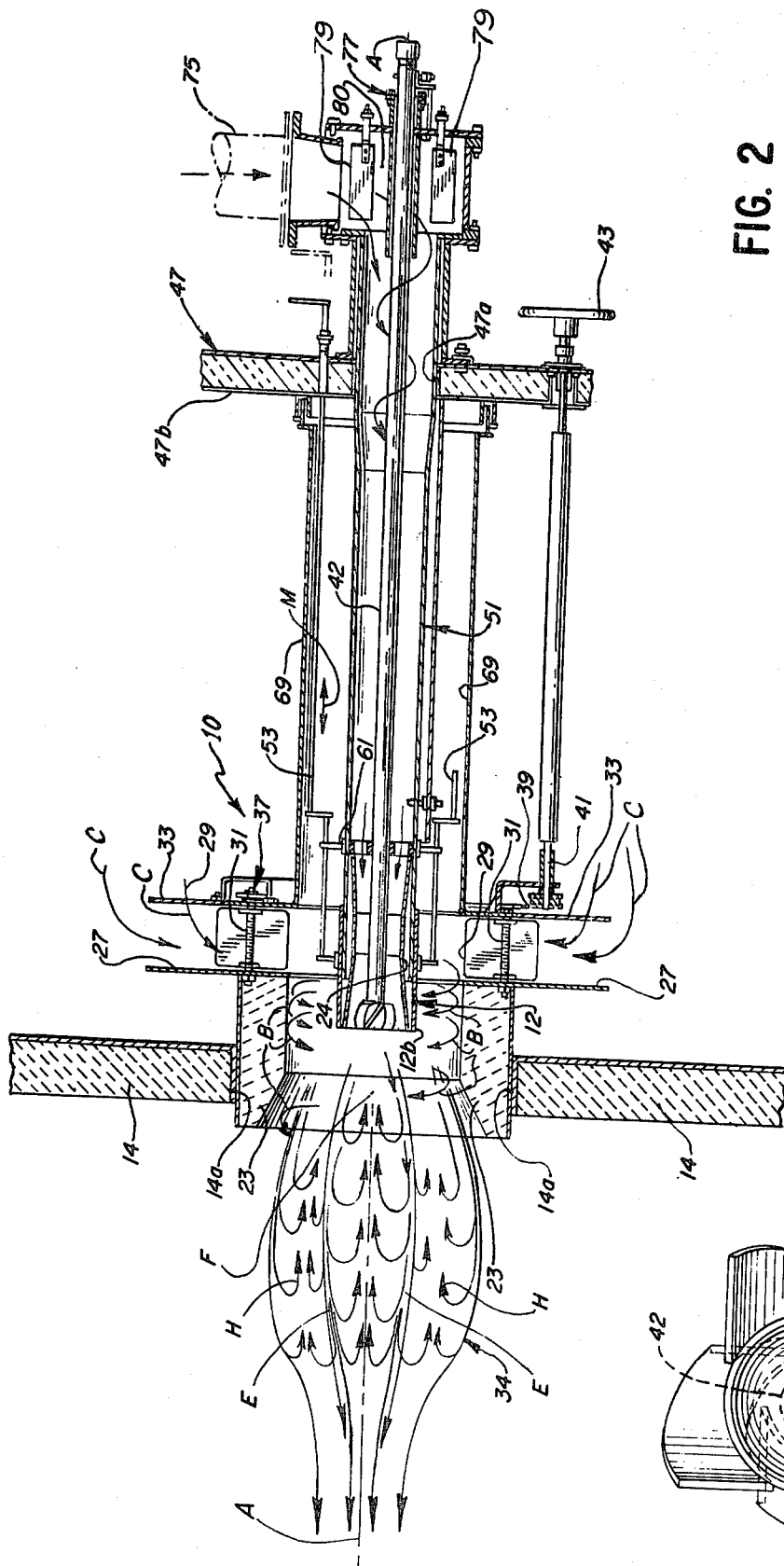
FIG. 2 is a cross-sectional view of a burner assembly employing the burner nozzle of FIG. 1.

Referring now more particularly to the drawings, therein is illustrated a new and improved venturi nozzle for burning pulverized coal and other fossil fuels generally referred to in FIG. 1 by the reference numeral 24. A burner assembly 10 adapted to employ the burner nozzle 24 is illustrated in FIG. 2. The burner nozzle 24 includes a primary, hollow, tubular, discharge conduit or nozzle 12, preferably formed of steel with a circular, transverse cross-section and mounted to extend into the center of a circular opening 14a formed in the wall 14 of a furnace.

The venturi nozzle discharge pulverized coal and primary air into the frustro-conical burner throat 23 and swirling secondary air is introduced into the throat in the annular space surrounding the venturi nozzle 12 along flow lines "B". The swirling action of the secondary air is imparted by a plurality of swirl vanes 29 which are mounted on rotatable support axles 31, extending between the front and rear annular plates 27, 33 of the secondary air register which surrounds the burner assembly 10, and supplies air indicated by arrows C between plates 27, 33.

The vanes 29 are collectively controlled to pivot in unison and for this purpose, a vane ring control assembly 37 is provided adjacent the outer surface of the outer register plate 33. A chain and sprocket drive system 39 driven and controlled by a shaft 41 and a handwheel 43 positioned outside of the burner front 41 is provided for selectively adjusting the angle of the vanes 29.

The burner front 47 is formed with a central opening 47a in order to accommodate a primary coal/air supply conduit 51 which supplies a flow of pulverized coal and primary air to the burner nozzle 12. As viewed in FIG. 2, a left-hand (inner) end portion of the supply conduit 51 also provides support for the burner nozzle 12 which is mounted for telescopic longitudinal sliding movement thereon. Control of the relative longitudinal position of the nozzle on the supply conduit is attained through two control rods 53 movable in the directions indicated by arrows "M".

A cylindrical burner barrel 69 is mounted in coaxial alignment with the primary supply conduit 51 to extend between the secondary air register plate 33 and the burner front 47.

The incoming flow of the primary coal/air mixture from the supply pipe 75 is directed into the burner nozzle head 80. The plurality of adjustable vanes 79 in the burner nozzle head are used to uniformly distribute the coal/air mixture in the coal nozzle head 80.

The venturi nozzle 24 in FIG. 1 provides a shallow sloped venturi structure having a generally frustro-conically shaped, divergent, nozzle outlet section 28 secured at its minimum diameter (inner) end to a cylindrical, intermediate, throat section 30. The inlet of the venturi nozzle is a frusto-conically-shaped, inlet or convergent, nozzle section 32 having a minimum diameter (inner) end joined to the upstream end of the intermediate throat section 30. The maximum diameter, upstream end of the convergent nozzle section 32 is mounted within the inside wall surface of the conduit 51 and is secured to a cylindrical shell 36.

The flame pattern issuing from the burner 10 is indicated in an animated fashion in the drawings and is referred to generally by the reference numeral 34 in FIG. 2. The flame pattern is considerably (2 to 3.5 times) longer than the flame pattern formed by typical prior art burners. The venturi nozzle 24, mounted in a position adjacent the the outlet end of the conduits 51, is believed to cause a doubling or tripling of the average flame length over that normally attained for a given flow and coal/air discharge velocity. The long flame pattern provides longer residence time for the coal in the coal/air mixture in the furnace to burn so that the coal burns at an lower peak temperature which reduces NOX formation.

As the coal/air mixture flows through the venturi nozzle the coal particles in the stream are concentrated toward the central portion of the flowing stream and are more uniformly distributed in the primary fuel/air mixture. The venturi nozzle provides an inner shell (arrows E) of coal and air formed around the outside of a central, or inner recirculation zone F. This recirculation zone is formed at the end of the conical coal spreader 40. The resulting discharge pattern is shown by the divergent arrows E (FIG. 2) which graphically illustrate a generally shallow, frustro-annular discharge pattern of the fuel/air stream as it enters the combustion zone within the furnace.

Figure 3:
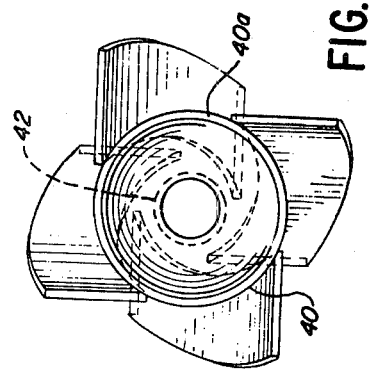
FIG. 3 is a transverse, cross-sectional view taken substantially along lines 3—3 of FIG. 1.

In accordance with the present invention, the novel venturi nozzle 24 includes a frustro-conically shaped, hollow, divergent flow spreader 40, shown in FIGS. 1 and 3, mounted in coaxial alignment within the divergent section 28 venturi nozzle. The slopes of the venturi nozzle divergence section 28 and coal spreader 40 define an annular, generally frustro-conically shaped flow passage 38 for directing the discharge of the coal/air stream outwardly into the combustion zone in a shallow, frustro-conical shaped discharge pattern as indicated by the arrows E in FIG. 2.

In a prototype embodiment of the venturi nozzle 24, the outer diameter of an outer shell 36 of the flow constrictor 24 was constructed to be approximately 7½ inches and the overall length of the venturi nozzle was 17½ inches. The inside diameter of the throat section 30 of the venturi nozzle was 5⅜ inches and the axial length of this throat section was 3 inches. The axial length of the divergent nozzle section 28 was constructed to be 8½ inches and the convergent nozzle section 32 was 6 inches in length. Accordingly, the angle of convergent slope in section 32 was somewhat greater than the angle of divergence in the section 28. The flow spreader 40 was constructed with a maximum diameter at an outer open end 40A of about 2¾ inches and the minimum diameter at the inner end of the spreader was about 1 inch. The spreader had a length in an axial direction of about 4 inches. Tests with a prototype of the size noted provided excellent results in terms of reduced NOX formation, and acceptable CO emission.

The small diameter end of the conical flow spreader 40 is supported and secured at the outer end of the central support tube 42 mounted in coaxial alignment on the center axis A—A in the burner nozzle 12. The support tube is moveable longitudinally in axial sliding movement in either direction as indicated by the arrows "G" (FIG. 1) by precise positioning of the outer end in the packing gland 77.

When the spreader cone 40 is moved inwardly (toward the right as shown in FIG. 2) the annular flow area 38 and the flow cross-section of the divergent discharge stream of coal/air mixture may be reduced slightly as the spreader cone is moved closer and closer to the throat section 30 of the venturi-like, fow constrictor 24. Conversely, when the support tube 42 is moved in an opposite direction (to the left), the flow area is increased. The velocity of the stream discharged from the object end 28a of the divergent flow section 28 may be readily controlled by movement of the spreader cone relative to the flow constrictor 24.

In order to stabilize combustion, venturi nozzle section 28 is provided with a plurality of swirl vanes 52 mounted on the outer surface of the spreader cone 40. These vanes impart a swirling action (arrows K, FIG. 1) to the primary coal/air stream in the passage 38 between the spreader cone and the inside surface of the divergent nozzle section 28 adjacent the outlet end 28a. The swirling action of the discharging coal/air stream imparted by the swirl vanes 52 increases the stability of the flame pattern 34 in the combustion zone and in the area immediately adjacent the outlet end 12b of the nozzle 12.

The swirling primary coal/air stream forms a wall surrounding a stagnant area (labeled F in FIG. 2), immediately adjacent the hollow outer end of the cone 40. The stagnant area F has a relatively low pressure and provides a reducing atmosphere of high temperature resulting in the volatiles in the pulverized coal being driven off and burned with minimal formation of oxides of nitrogen or NOx. This is accomplished because of the reducing atmosphere, and the high temperatures in this area.

The proper matching of velocities between swirling secondary air (arrows B) and the swirling primary coal/air stream E discharged from the outlet end of the burner nozzle 12 is believed to provide a second or outer recirculation zone H of torroidal configuration outside and around the stagnant area F. The entry of secondary or outside air into the primary coal/air mixture is minimized so that a reducing atmosphere of high temperature is maintained. The concentric inner and outer recirculation zones cause a portion of the combustion products to be drawn back towards the burner nozzle outlet 12b as indicated by the inner and outlet flame path arrows. A rapid devolitilization and combustion of the coal is thus accomplished without forming excessive quantities of oxides of nitrogen (NOX) which are polluting to the atmosphere.

The venturi nozzle 24 applied to a conventional swirl stabilized burner provides stratified combustion because of the novel geometry of the burner venturi nozzle as described above, and in a manner resulting in a reduced production of nitrogen oxide emissions. The venturi nozzle 24 is positioned adjacent the outlet end of the nozzle 12 and this forms a long flame pattern to provide a lower peak flame temperature. The average time interval for burning of the coal is substantially increased thereby to maintain efficient combustion.

The convergent or entry section 32 of the venturi nozzle 24 tends to concentrate the coal particles toward the central portion of the accelerating coal/air stream and more evenly distributes the coal in the primary flow. This stream passes into a condition of low pressure and high velocity in the throat section 30 and subsequently, the coal/air stream is decelerated while forming an annularly shaped, swirling flow pattern around the hollow spreader cone 40. The annular stream is caused to swirl by the swirl vanes 52 in the outlet passage 38 between the confining annular surfaces of the spreader cone 40 and the inner surface of the divergent nozzle section 28. The swirling action tends to stabilize combustion. The swirling action also helps to establish the stagnation area F early in the combustion process at the open end of the spreader cone 40. In this area volatiles in the coal are evolved and burned in a high temperature, reducing atmosphere without significant formation of oxides of nitrogen. The coal burning process in the flame pattern 34 takes place over a relatively long time period and the peak flame during the combustion process is considerably lower than in prior art burners. These factors are also believed to contribute to the reduced amount of oxides of nitrogen that are formed.

Although the present invention has been described with reference to a single illustrated embodiment thereof, it should be understood that numerous other modifications and embodiments can be made by those skilled in the art that will fall within the spirit and scope of the principles of this invention.

What is claimed as new and is desired to be secured by Letters Patent is:

1. A method of burning pulverized coal and other fuels comprising the steps of:

containing a primary flowing stream of coal/air mixture received adjacent an inlet end of tubular nozzle means for discharge at an outlet end into a combustion zone of a furnace for burning;

accelerating said stream of coal/air mixture in a convergent venturi section upstream of said outlet end of said nozzle means to concentrate the coal particles toward a central portion of the stream in a minimum throat area of said venturi;

decelerating said flowing stream downstream of said throat in a divergent flow section of said venturi while forming an annular, shallow sloping conically shaped flow pattern around an imperforate wall surface of a spreader cone in said divergent section and having a hollow outer end adjacent said outlet end of said nozzle means;

causing said annular flow pattern to swirl around the axis of said cone outwardly thereof within said convergent flow section of said venturi forming a stable, annularly-shaped, flow pattern discharging into said combustion zone;

burning said discharging coal with an elongated flame pattern in said combustion zone extending along said stabilized conical flow pattern;

forming a shielded stagnation area of high temperature and reducing atmosphere adjacent said hollow outer end of said cone for driving off the volatiles in said coal early in the combustion process; and burning off said volatiles in a reducing zone in a continuing burning process reducing the formation of oxides of nitrogen.

2. The method of claim 1 including the step of forming a zone of low pressure adjacent the center axis of said discharging flow pattern for drawing back a portion of the combustion products toward said hollow outer end of said cone to establish a recirculation area of high temperature to rapidly volatilize and burn off said volatiles in a reducing atmosphere.

3. The method of claim 2 including the step of forming a wall of swirling coal and air around said recirculation area to provide a reducing atmosphere at high temperature.

4. The method of claim 3 including the step of creating a torroidal recirculation zone around said stabilized annular flow pattern by introducing a swirling flow of secondary air around said nozzle means for discharge into said combustion zone around the outlet end of said nozzle means.

5. The method of claim 4 including the step of adjusting the velocity of said secondary air flow to establish said outer torroidal recirculation zone around said stabilized, annular flow pattern.

6. A method of burning pulverized coal and other fuels comprising the steps of:

containing a primary flowing stream of coal/air mixture received adjacent an inlet end of tubular nozzle means for discharge at an outlet end into a combustion zone of a furnace for burning;

accelerating said flowing stream of coal/air mixture in a shallow convergent venturi section upstream of an outlet end of said nozzle means to more uniformly distribute and concentrate the coal particles toward a central portion of the flowing stream as it passes through a cylindrical and minimum diameter throat section of said venturi;

decelerating said flowing stream while spreading the flow in a shallow, annular, conically shaped diverging flow pattern around an imperforate wall surface of a hollow spreader cone in a divergent portion of said venturi section adjacent said outlet end;

causing said annular, conically shaped diverging flow pattern to swirl around the axis of said cone forming a stable, annular, flow pattern of shallow, frusto-conically divergent shape around said cone discharging from said nozzle means into said combustion zone;

burning said discharging coal in an elongated flame pattern extending along said stabilized conical flow pattern;

and maintaining a high temperature reducing zone immediately downstream of said hollow cone within said stable swirling flow pattern discharging from said nozzle means.

* * * * *